US006989527B2

(12) United States Patent
Bosco et al.

(10) Patent No.: US 6,989,527 B2
(45) Date of Patent: Jan. 24, 2006

(54) METHOD, SYSTEM AND COMPUTER PROGRAM PRODUCT FOR COLLECTING AND STORING RADIATION AND POSITION DATA

(75) Inventors: Charles D. Bosco, Madison, AL (US); William Sabados, Lafayette, IN (US); Gary Maddux, Scottsboro, AL (US)

(73) Assignee: University of Alabama in Huntsville, Huntsville, AL (US)

( * ) Notice: Subject to any disclaimer, the term of this patent is extended or adjusted under 35 U.S.C. 154(b) by 252 days.

(21) Appl. No.: 10/441,934

(22) Filed: May 20, 2003

(65) Prior Publication Data

US 2004/0232323 A1 Nov. 25, 2004

(51) Int. Cl.
*G01V 5/00* (2006.01)
(52) U.S. Cl. .................................................. 250/253
(58) Field of Classification Search ................ 434/218; 250/253
See application file for complete search history.

(56) References Cited

U.S. PATENT DOCUMENTS

| | | | | |
|---|---|---|---|---|
| 3,715,593 | A | * 2/1973 | McGunigle | ................. 250/374 |
| 4,582,491 | A | * 4/1986 | Monteith | ..................... 434/218 |
| 5,286,973 | A | 2/1994 | Westrom et al. | |
| 5,324,948 | A | 6/1994 | Dudar et al. | |
| 5,606,165 | A | 2/1997 | Chiou et al. | |
| 5,719,500 | A | 2/1998 | Eschner et al. | |
| 5,773,821 | A | 6/1998 | Jones | |
| 5,807,113 | A | * 9/1998 | Groeber | ...................... 434/218 |
| 5,886,664 | A | 3/1999 | Yujiri et al. | |
| 5,936,240 | A | 8/1999 | Dudar et al. | |
| 2001/0032928 | A1 | 10/2001 | Boone | |
| 2004/0149918 | A1 * | 8/2004 | Craig et al. | ............ 250/370.01 |
| 2004/0251422 | A1 * | 12/2004 | Overhoff | ..................... 250/376 |

FOREIGN PATENT DOCUMENTS

FR 2693583 A1 * 1/1994
JP 08334563 A * 12/1996

OTHER PUBLICATIONS

Anonymous, UAH scientists develop system to map areas hit by 'dirty' bomb. [online University of Alabama in Huntsville News & Events] May 21, 2002 [retrieved Mar. 23, 2005] Retrieved from the Internet: <URL: http://uah-news.uah.edu/read.asp?newsID=162>.*
"The NMEA FAQ—Version 6.3, Apr. 25, 2000". The Internet. http://vancouver-webpages.com/peter/nmeafaq.txt. Downloaded Jan. 6, 2003.
"GM-10 and GM-45 Geiger Counter/Radiation Detector and Software—For Windows and Macintosh". The Internet. http://www.blackcatsystems.com/GM/. Downloaded Jan. 28, 2003.

* cited by examiner

*Primary Examiner*—Constantine Hannaher
(74) *Attorney, Agent, or Firm*—Alston & Bird LLP (57) ABSTRACT

A handheld system for collecting and storing radiation data and position data includes both a radiation detector and a position detector interfaced to a handheld computer. The handheld computer retrieves and time correlates position data and radiation data for storage in a computer storage medium. A computer program code is also stored in the storage medium and includes executable portions adapted to retrieve both radiation data and position data and also adapted to time correlate radiation data and position data for storage in the storage medium. Methods of using a handheld system are provided that include carrying the handheld system to radiation areas for collecting and storing radiation data and position data for universal mapping. A method of training personnel for using a handheld system provides radiation data and a computer storage medium that simulates higher radiation readings correlated to position data for simulating a radiation area.

38 Claims, 4 Drawing Sheets

METHOD, SYSTEM AND COMPUTER PROGRAM PRODUCT FOR COLLECTING AND STORING RADIATION AND POSITION DATA

FIELD OF THE INVENTION

The invention relates generally to radiation mapping methods and systems, and, more particularly, to methods, systems, and computer program products for collecting and storing radiation and position data on a handheld computer.

BACKGROUND OF THE INVENTION

Radiation monitoring personnel generally work in the nuclear power community. These personnel are trained to conduct radiation surveys and contamination surveys of radiation areas and radioactive contamination areas. Radioactive contamination areas and radiation areas may come about by way of nuclear accidents involving, for example, leakage of radioactive particles from nuclear power plants. Radioactive contamination and radiation in an area may be accounted for due to multiple sources, including surface particulate contamination, air particulate contamination, and radioactive "hot spots." It is desirable to know and set up perimeters for safe working conditions in and around radioactive contamination areas and radiation areas. For example, the United States Department of Energy promulgates predetermined radiation and contamination levels, and safe working criteria for radiation areas and contamination areas as described in the U.S. Department of Energy Radiation Control Manual, DOE/EH-0256T. Radiation monitoring personnel generally survey radiation areas and contamination areas to assess, monitor, and establish controls for theses areas in accordance with the promulgated criteria.

To this end, many radiological survey devices have been provided in the prior art to conduct surface contamination surveys, air particulate surveys, hot spot surveys, and background radiation surveys. These devices include Geiger-Mueller counters, scintillation detectors, proportional detectors or the like. For example, a surface contamination survey typically comprises placing a Geiger-Mueller counter relatively close to a surface area contaminated with radioactive particles, measuring the contamination in counts per minute. General rules of thumb are used to convert counts per minute to curies per square area or other similar surface contamination units. Alternatively or in addition to surface contamination surveys, air particulate surveys are conducted by evacuating a volume of air through a filter and measuring the counts from particulate on the filter with a Geiger-Mueller counter. Generally, a cubic meter of air is evacuated in order to convert the counts per minute into a unit of micro-curies per volume of air. Background and hot spot radiation surveys are often conducted with either Geiger-Mueller counters or scintillation detectors. Radiation monitoring personnel place the radiation detector within a range from a hot spot or throughout an area of background radiation and record radiation levels with respect to position.

Often radiation monitoring personnel carry maps and record radiation readings with respect to their position on the map. However, compilation of map data, including surface contamination surveys, radiation surveys, and air particulate surveys is a cumbersome process. A substantial amount of time is required to compile completed survey results, and environmental conditions may render the compiled data obsolete. For example, wind, rain, or other environmental parameters cause scattering of air particulate and surface particulate. Therefore, it is often necessary to determine the effect of environmental conditions upon the survey data in a short period of time. Delays in the compilation of data adversely affect the ability to account for environmental conditions. Accordingly, there is a need in the art for faster compilation of survey data.

Until recently, radiation and contamination surveys were considered primarily in the context of the nuclear power industry, and regulated in the United States by the United States Department of Energy. Radiation surveys are considered relatively ineffectual in the event of a nuclear bomb detonation, as the magnitude of radiation is dramatically higher. Therefore, civilian emergency response personnel, such as firefighters, emergency medical technicians, police officers, etc. were not trained to conduct such surveys. Accordingly, radiation survey equipment has remained very technical and specific to nuclear power industry trained radiation monitoring personnel. As a result, civilian emergency response personnel may find it rather difficult to use existing survey equipment.

Today, however, it is thought that terrorists may procure nuclear materials to combine with standard ordnance in order to produce a "dirty" bomb. Such a bomb would spread radiation using conventional explosives. The immediate damage of a bomb of this type is limited to the surrounding people and property. The larger problem is the wide distribution of radioactive particulate, which would pose a long term danger.

Civilian emergency response personnel are more likely to be the first responders to the scene of a "dirty" bomb explosion. Civilian emergency response personnel will have to rapidly assess the situation and care for the immediate casualties. Just as importantly, they must be able to assess the extent of the radiation threat so that they can evacuate people, control access, and begin clean up. In the case of a large bomb blast, the affected area may be very large and the intensity of the radiation may vary extensively. The surveys will be taken manually in a manner similar to the surveys described above. Therefore, civilian emergency response personnel now have a need for effective radiation survey equipment, which is simpler than the survey equipment used by nuclear industry trained radiation monitoring personnel.

Additionally, civilian emergency response personnel will compile the radiation survey data in a manner similar to that of the previously described compilation by nuclear power industry radiation monitoring personnel. For the same reasons, it is necessary to assess the survey results and determine the affect of environmental conditions upon the survey data in a short period of time. Therefore, these centers will require the ability to receive survey data as quickly as possible.

Accordingly, there is a need in the art to have the ability to quickly compile radiation survey data. A radiation surveying device for this purpose should be easily used by both nuclear industry trained radiation monitoring personnel and civilian emergency response personnel alike. It would also be advantageous for the device to be small and portable. As such, it may be hand carried into areas of radiation and contamination for quick and effective compilation of radiation data in real time. Furthermore, there is an additional need for quick transmission of radiation survey data to places remote from the radiation and contamination areas.

BRIEF SUMMARY OF THE INVENTION

According to one embodiment of the invention, a system addresses the aforementioned problems and others in a handheld system for collecting and storing radiation and position data over large areas. The radiation data and position data of such a handheld system may be transmitted to a remote system for universal data collection. A remote system can produce a real time map of an affected area by displaying the intensity of radiation at enough locations to allow emergency personnel to rapidly isolate the danger areas. In one embodiment, the handheld system can wirelessly transmit data to the remote system while one or more emergency workers are traversing a radiation area.

According to one embodiment, a handheld system for collecting and storing radiation data comprises a handheld computer, a radiation detector, and a position detector. The radiation detector and position detector are interconnected to the computer to provide radiation and position data. The computer generally comprises a microprocessor, a storage medium, and a serial interface for interconnecting to the radiation detector and the position detector. The radiation detector typically provides radiation data in serial format to the microprocessor. Similarly the position detector typically provides position data such as latitude and longitude from a global positioning system. A computer program code is disposed on the computer and retrieves data from the position detector and the radiation detector. The radiation data and position data are time correlated and stored in the computer storage medium.

Also according to an embodiment of the invention, a computer program product for retrieving and storing radiation data from the serial interface on a handheld computer may include multiple executable portions. One executable portion is adapted to retrieve and time scale average serial radiation data from a radiation detector. Time scale averaging often comprises averaging counted radiation impulses over a sliding time scale. A resultant average is therefore provided at a time in counts per minute. Another executable portion retrieves serial position data from the position detector concurrent to and independent of retrieving radiation data. As such, both the radiation data and position data may be correlated with respect to time and stored in the computer storage medium. Other embodiments of a computer program product may include additional executable portions that operate wireless transmitters for transmitting correlated radiation and position data. Also an executable portion may generate cues, such as audible or visual alarms and displays for communicating radiation data and position data to a user of the handheld computer.

Another aspect of the invention includes a method of mapping radiation with a handheld system comprising a handheld computer, a position detector, and a radiation detector. The method includes carrying the system into an area of radioactivity and retrieving the radiation data from the radiation detector to the handheld computer. Position data is retrieved from the position detector concurrent to the step of retrieving radiation data. Both the radiation data and the position data are time correlated and stored in a computer storage medium.

A method of training personnel to map radiation with a system comprising a computer and a position detector is also provided. The method includes carrying the system to a training area which may typically simulate an area of radioactivity. Position data is retrieved from the position detector to the handheld computer, and corresponding radiation data is retrieved from the computer storage medium in the handheld computer. This radiation data is simulated data to provide the user with simulation of higher radiation levels. The radiation data and the position data are correlated corresponding to a time, and the correlated data is stored in the computer storage medium.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
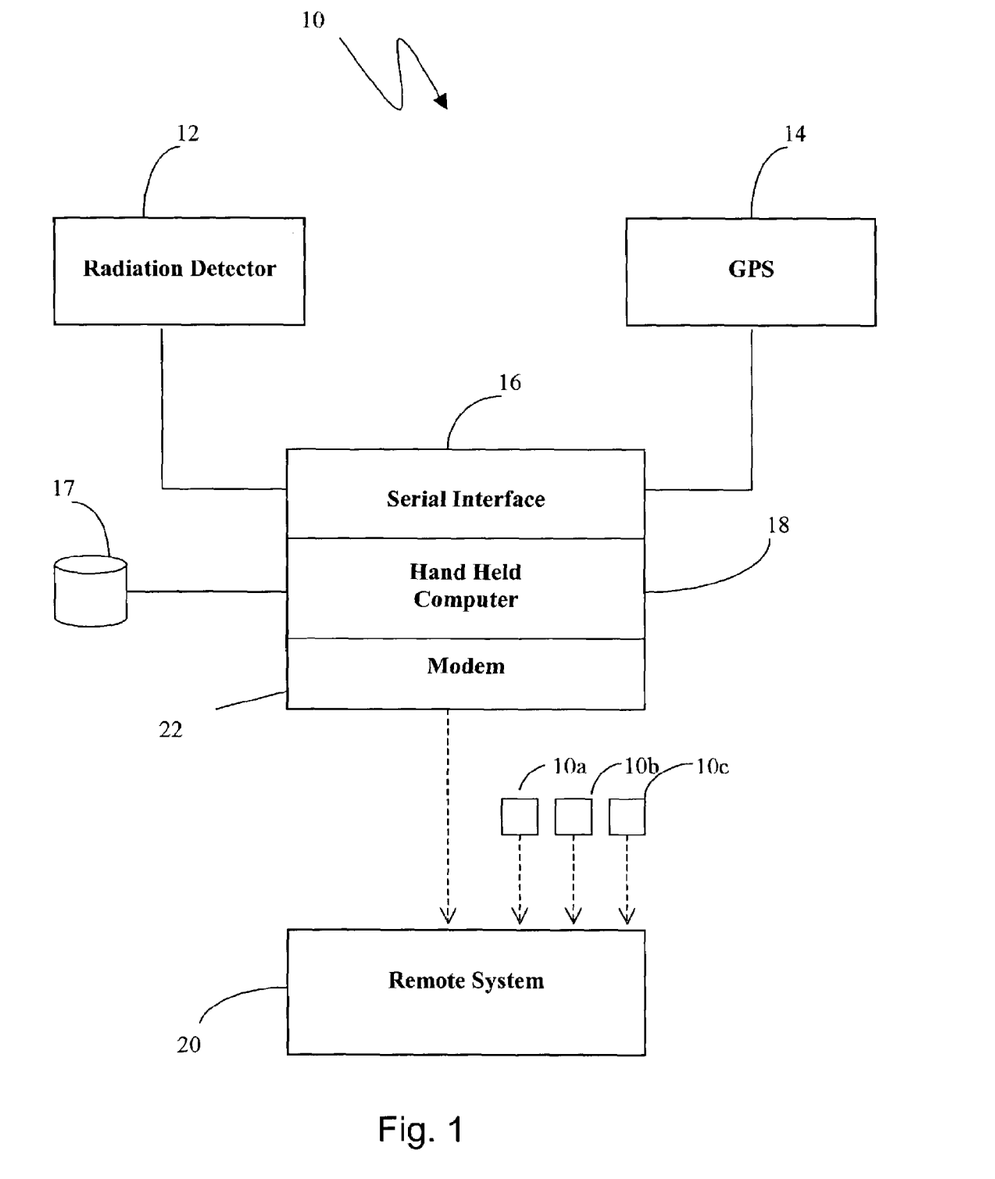
FIG. 1 is a block diagram illustrating functional interconnections of a system for collecting and storing radiation and position data according to one embodiment of the invention.

FIG. 1 illustrates one embodiment of a handheld system 10 for collecting and storing radiation data. The handheld system 10 generally comprises a handheld computer 18 having at least one serial interface 16 that interconnects a radiation detector 12 and a position detector, such as a global positioning system (GPS) detector 14 in this embodiment. The handheld computer 18 operates generally by way of a computer program code disposed in a storage medium 17 in the computer 18. According to this particular embodiment of the invention, a handheld system 10 for collecting and storing radiation data is described in conjunction with its use for mapping and evaluating radiation or contamination areas. The handheld computer of this embodiment also includes a wireless transmitter, such as a modem 22, for transmitting data to a remote system 20, such as a remote computer or computer network.

Such radiation and contamination areas may be the result of nuclear accidents or incidents, as described above, and the invention therefore provides a portable handheld system 10 to quickly and effectively map and communicate areas of radiation to a remote system 20. The remote system 20 may likewise receive radiation data from multiple handheld systems 10a, 10b, 10c for synthesis of a universal map of radiation and contamination throughout a nuclear accident area. The radiation data may comprise multiple types of measurement including background radiation, surface contamination, air particulate radiation measurements, hot spot radiation, or other types of radiation measurements. Accordingly, as used herein, the term radiation data corresponds to any or all of these types of radiation measurements.

The handheld computer 18 of the system 10 may advantageously comprise any handheld personal computers that are commonly available in many commercial embodiments. These handheld personal computers typically comprise a microprocessor and an operating system stored on an internal storage medium. The operating system controls the execution of computer program codes and allocates computer resources, job control, input/output control, and file management. These personal computers also include a user interface and display, such as a graphic user interface, that permits the user to provide commands and input/output to the operating system in execution of the described functions. In this case, the user interface permits operation and execution of computer program product or code that interfaces with the communications ports to which the radiation detector 12 and GPS position detector 14 are connected.

In one embodiment of a handheld system 10, the handheld computer 18 comprises a Compaq IPAQ manufactured by the Compaq Corporation and associated peripherals. Generally, the Compaq IPAQ comprises an operating system such as Windows CE available from Microsoft Corporation, and permits the execution of computer program code to retrieve data from the communications interfaces to which the GPS position detector and radiation detector are associated. The serial interface 16 described in FIG. 1 according to this embodiment may comprise a PCMCIA interface such as dual-slot PC card expansion pack, Part No. 216198-B21 also available from the Compaq Corporation, a socket serial I/O card and flash adapter, each respectively placed within a selected slot of the dual-slot PC card expansion pack for interfacing to the GPS detector 14 and the radiation detector 12.

GPS position detectors 14 generally provide position data in accordance with National Marine and Electronics Association standards, which defines the electrical interface and data protocol for communications between marine instrumentation. These standards are available from the National Marine and Electronics Association, P.O. Box 3435, New Bern, N.C. Generally, position data is provided in ASCII format corresponding to codes under the NMEA-0183 standard and in this case provided in serial format to a handheld computer. Additional data is often provided concurrent to position data according to NMEA-0183. This additional data may be advantageously used for various purposes consistent with the basic function of a handheld system for collecting and storing radiation data and in addition to the functions already described without departing from the spirit or scope of the invention. For example, many GPS systems also provide elevation data, bearing and distance to a waypoint, the number of satellites in view, heading of the GPS device, speed over ground, and other similar dead reckoning type data. While a GPS position detector provides one advantageous embodiment due to prominent commercial availability, other position detectors may be substituted for the GPS position detector without departing from the spirit or scope of the present invention. Other position detectors include, for example, Loran navigation systems, satellite navigation systems, dead reckoning systems, and gyroscopic navigation systems.

The GPS position detector 14 of this particular embodiment comprises a TELETYPE CF GPS receiver available from World Navigator, product number 1358, series number 1359, which includes a PCMCIA interface for interconnection to the serial interface 16. In this regard, it is advantageous that the GPS position detector be readily interfaced via a serial connection to a personal computer. As such, the interface with a communications port may be controlled and managed by an operating system such as previously described.

The radiation detector 12 may comprise any commercially available radiation detectors and include Geiger-Mueller detectors, scintillation detectors, and proportional detectors. In particular, Geiger-Mueller radiation detectors advantageously permit the ability to survey raw counts of radiation data regardless of the type of radiation and is practical for large scale low cost applications. Geiger-Mueller tube type counters generally comprise a pair of electrodes surrounded by helium or argon. As radiation, either alpha, beta, or gamma, enters the tube, it ionizes the helium or argon gas and the ions are attracted to the electrodes generating an electric current. The current is therefore a pulse, which may be counted by a scalar. A single count occurs anytime the gas is ionized. This raw data count is therefore provided by the scalar in serial format to the computer 18 for further processing by way of time scale averaging.

The radiation detector 12 of this particular embodiment comprises a GM-10 radiation detector available from Black Cat Systems. The GM-10 is a counter type radiation detector and comprises a Geiger-Mueller tube commonly referred to as a Geiger counter that detects alpha, beta, and gamma radiation. The GM-10 is compatible with a serial interface 16 of the handheld computer 18 by way of an auxiliary PCMCIA card, which in this embodiment is interfaced to the handheld computer 18 by way of a dual-slot PC card expansion pack. Advantageously, the GM-10 is powered from the computer's serial port and therefore does not require additional power supply. This advantageous embodiment permits a relatively small and portable handheld system facilitating ease of use while surveying a radiation area.

The foregoing specific embodiments of the position detector, radiation detector, and handheld computer therefore provide one economically advantageous embodiment of the invention which is produced from commercially available hardware components. However, technology is generally progressing toward smaller and more easily integrated handheld computers, radiation detectors, and position detectors that include multiple interfaces, and higher data processing speeds. Accordingly, it will be obvious to one of ordinary skill in the art that other handheld computers, radiation detectors, and position detectors may be substituted in any combination without departing from the spirit or scope of the invention.

Returning to FIG. 1, the handheld system 10 generally transmits radiation data and position data to a remote system, and additionally multiple handheld systems 10*a*, 10*b*, 10*c* provide radiation and position data to a remote computer 20 for universal mapping of a radiation area or a contamination area. Transfer of data between the handheld computer 18 and the remote system 20 may be accomplished in a number of advantageous ways including wireless transfer such as dedicated radio frequency transfer, infrared transfer, or dedicated wire-to-wire serial interfaces with the remote system. According to one embodiment, the handheld computer 18 may include a communications modem 22 capable of cellular telephone communication. This particular embodiment is advantageous in areas that have higher densities of cellular communications media. In fact, emergency communication systems such as 9-1-1 reserve dedicated access to cellular communications media throughout the country in times of emergency and crises. As such, the cellular modem 22 on the handheld computer 18 may comprise a modem compatible with an emergency cellular system such as the 9-1-1 system. Therefore, in the event of a nuclear accident, radiation data and position data may advantageously be transferred uninterrupted to a remote system during such accidents.

Figure 2:
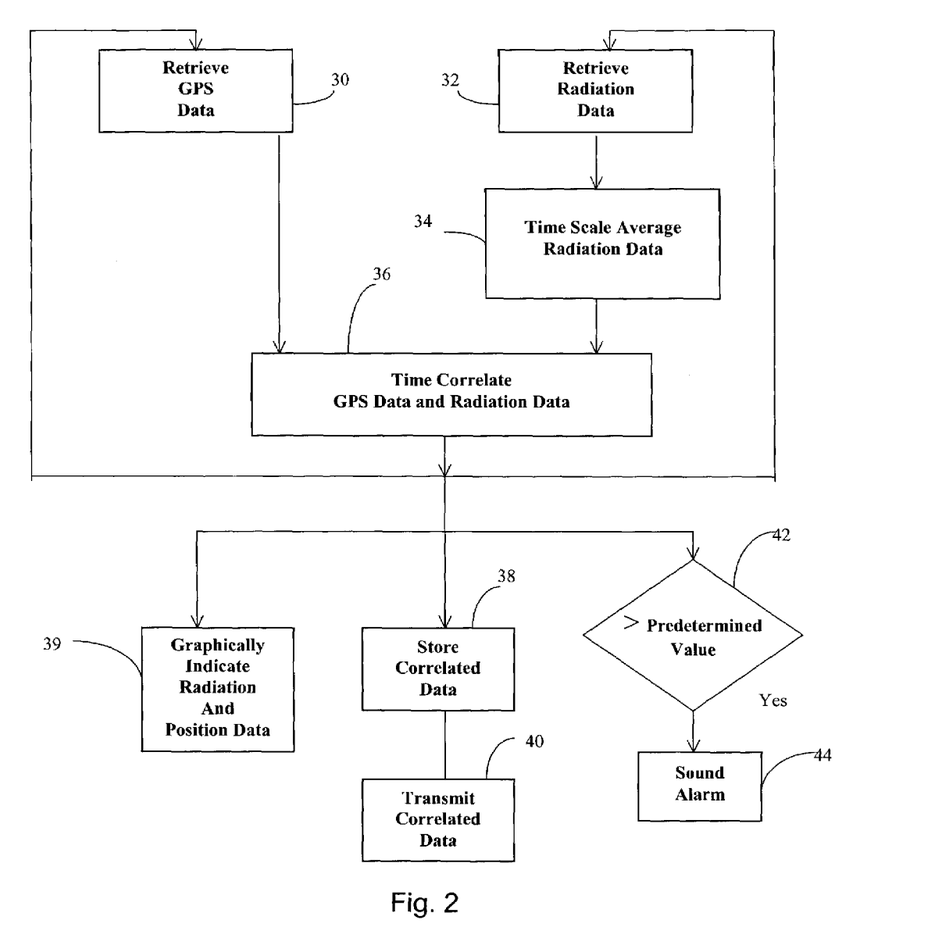
FIG. 2 is a flow diagram illustrating a method and computer program product for collecting and storing position data and radiation data according to one embodiment of the invention.

Referring now to FIG. 2, one embodiment of a method and computer program product for retrieving and storing radiation data is illustrated. The computer program product is generally disposed within storage mediums of a handheld computer including volatile and non-volatile storage mediums as known to those of ordinary skill in the art. The flowchart of FIG. 2 therefore illustrates concurrent operations including both retrieving GPS data from the GPS detector block 30 and retrieving radiation data from the radiation detector block 32. These two steps are accomplished concurrently so that position data and radiation data may be correlated to a particular time block 36, and readings otherwise do not become stale with respect to one another. In this context concurrently is used to refer to events occurring at substantially the same time or within a same time period. It should also be noted that collection of the position data and radiation data occur independently of one another. That is to say that no position event is required to begin collection of the radiation data, nor is a radiation event required to begin collection of the position data.

Also according to this embodiment, the radiation data retrieved from the GM-10 are serial counts from the Geiger-Mueller tube. Serial counts are time scale averaged block 34 to provide radiation data in the commonly used form of counts per minute (CPM). In one embodiment, time scale averaging of the radiation data comprises a sliding time scale wherein counts are received over a period of time such as 60 seconds, and counts for those 60 seconds are added up to determine counts per minute. As time progresses, the time scale correspondingly slides adding the most recent time data and eliminating the oldest time data. For example, in a five-second increment, the latest five seconds and previous 55 seconds may be counted, discarding the first five seconds of the previous data. These and many other methods of time scale averaging of Geiger-Mueller counting data, scintillation detector counting data, and proportional detector counting data are known to those of ordinary skill in the art and may be substituted accordingly.

Upon time scale averaging the radiation data and retrieving the GPS data, selected predetermined intervals may be chosen to time retrieve GPS data and radiation data. The predetermined intervals permit correlation the GPS data and radiation data block 36 in a table according to the chosen intervals. The intervals may be either a time, position, or particular distance, and as such provide a table that may be plotted by position and radiation according to the intervals. The plotting of tables therefore advantageously aids the examination of the data to determine the extent of the radiation. The time correlated data is stored in computer storage medium block 38 of the handheld computer. Again, the computer storage medium may comprise all types of volatile or non-volatile storage medium as known to those of ordinary skill. According to one embodiment, storing in computer storage medium comprises transferring the radiation data and position data to a data table in comma delimited format as commonly used by spreadsheets and other software data table applications. The stored radiation and position data may be subsequently transmitted block 40 by the wireless modem or other transmission device to the remote computer for a collection of multiple handheld systems radiation data and position data.

It is also important that personnel who collect the data be aware of the radiation levels in the area from which they are taking samples. Therefore, a cue, such as an audible alarm block 44 set to greater than a predetermined value block 42, is provided to warn the user that radiation may have exceeded a predetermined value. The predetermined value may be chosen according to the desired safety concerns for protecting personnel monitoring radiation areas or contamination areas. Other cues may be established, including visual cues displayed on the graphic output block 39 of the handheld computer. These and other cues need not be established with respect to predetermined limits but may advantageously include continuous cues, such as real time read outs of radiation data. Similarly, it may be advantageous to provide general readings of GPS data or other position data by way of a screen display so that the user may easily view and consider his position with respect to the radiation data.

Figure 3:
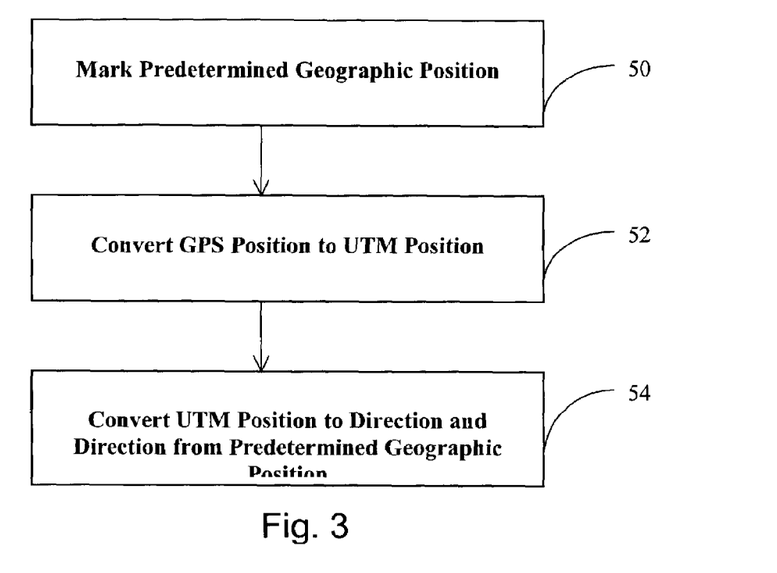
FIG. 3 is a flow diagram illustrating a method and computer program product for collecting and storing position data and radiation data according to one embodiment of the invention.

FIG. 3 illustrates an additional embodiment of a method and computer program product for a handheld system 10 for converting position data to another format. In many cases it is not always convenient to use only latitude and longitude data provided by a GPS detector. It may be preferable to measure radiation with respect to position in terms of direction and distances from a predetermined geographic reference, such as a well known landmark. Therefore, according to this embodiment, the computer program product and method also comprise marking a predetermined geographic reference position block 50 in the handheld computer. The marking may comprise choosing a well known geographic position such as a street corner, a building, or some other position as a basis for a starting point for all radiation data and position data measurements. The predetermined geographic position may be chosen by selecting the GPS latitude and longitude position data, or manually entering a chosen latitude and longitude position data already known for some other landmark.

Upon receiving GPS position data in latitude and longitude format, the GPS position data is then converted to a distance and direction away from the predetermined geographic position. For example, the distance and direction may be marked in cardinal points (North, South, East, and West) away from the predetermined geographic position. Generally, two perpendicular cardinal points are chosen relative to the predetermined geographic position. For example, the direction and distance may be given in some distance D1 North and D2 West of the predetermined geographic position. Other methods of converting to distance and direction may include providing a range and compass direction from the predetermined geographic position. For example, the direction and position may be given as some range, R, in a direction, XXX degrees, from the predetermined geographic position.

One advantageous method to convert latitude and longitude comprises converting the GPS position data to Universal Transverse Mercator (UTM) data block 52, which is commonly used by those of ordinary skill in the art to determine position data based on sectors of the globe. Like latitude and longitude, UTM coordinates identify a unique position. Unlike latitude and longitude, the position is identified in distances relating to X and Y coordinates from origins within particular sectors (the X and Y axes corresponding to axes of the cardinal points, North, South, East, and West). UTM units are identified in meters from an X, Y origin, and therefore permits a user to consider distances in terms more familiar than latitude and longitude units, degrees and minutes of degrees. As such, UTM is often more practical to a user than latitude and longitude, particularly when the user is surveying areas in relative distances.

Figure 4:
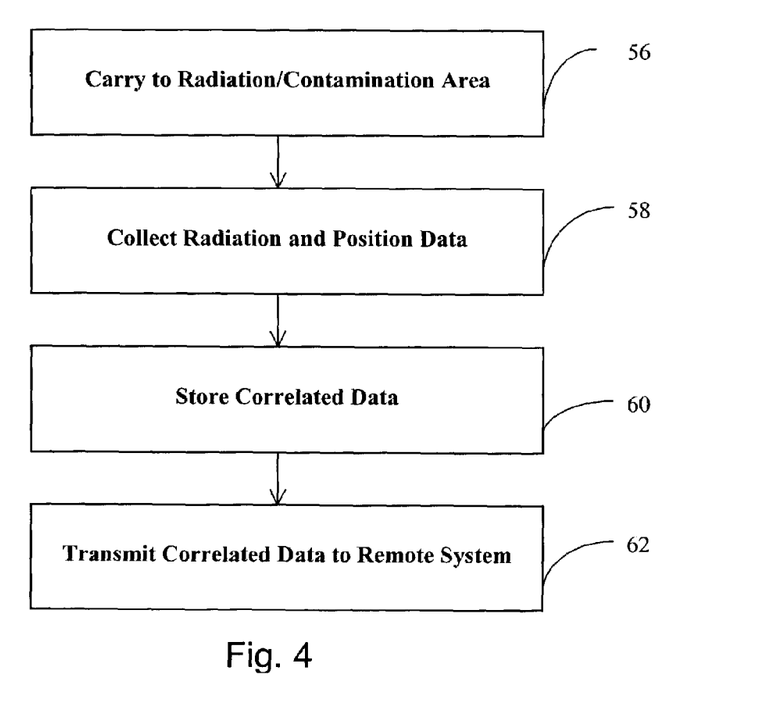
FIG. 4 is a flow diagram illustrating a method and computer program product for converting position data according to one embodiment of the invention.

FIG. 4 illustrates one advantageous method of measuring and storing radiation and position data using a handheld system 10 as in FIG. 1. The handheld system 10 is advantageous as it permits radiation monitoring personnel to carry the system into a radiation area or a contamination area block 56 in order to collect the data quickly and efficiently. As multiple handheld systems 10a, 10b, 10c may be used, multiple areas of radiation position data may be collected simultaneously block 58 and in order to be provided to a remote computer block 62 for universal mapping in a quick and efficient manner. Accordingly, radiation data and position data are collected as the user moves from position to position. As additional radiation and position data are collected, the data may be stored block 60 in the storage medium of the handheld system and later transmitted to the remote system block 62 for universal mapping of multiple handheld systems 10a, 10b, 10c. Alternatively, the handheld system 10 may continuously transmit data to a remote system, such as by way of cellular devices and modems or other radio frequency communications.

Figure 5:
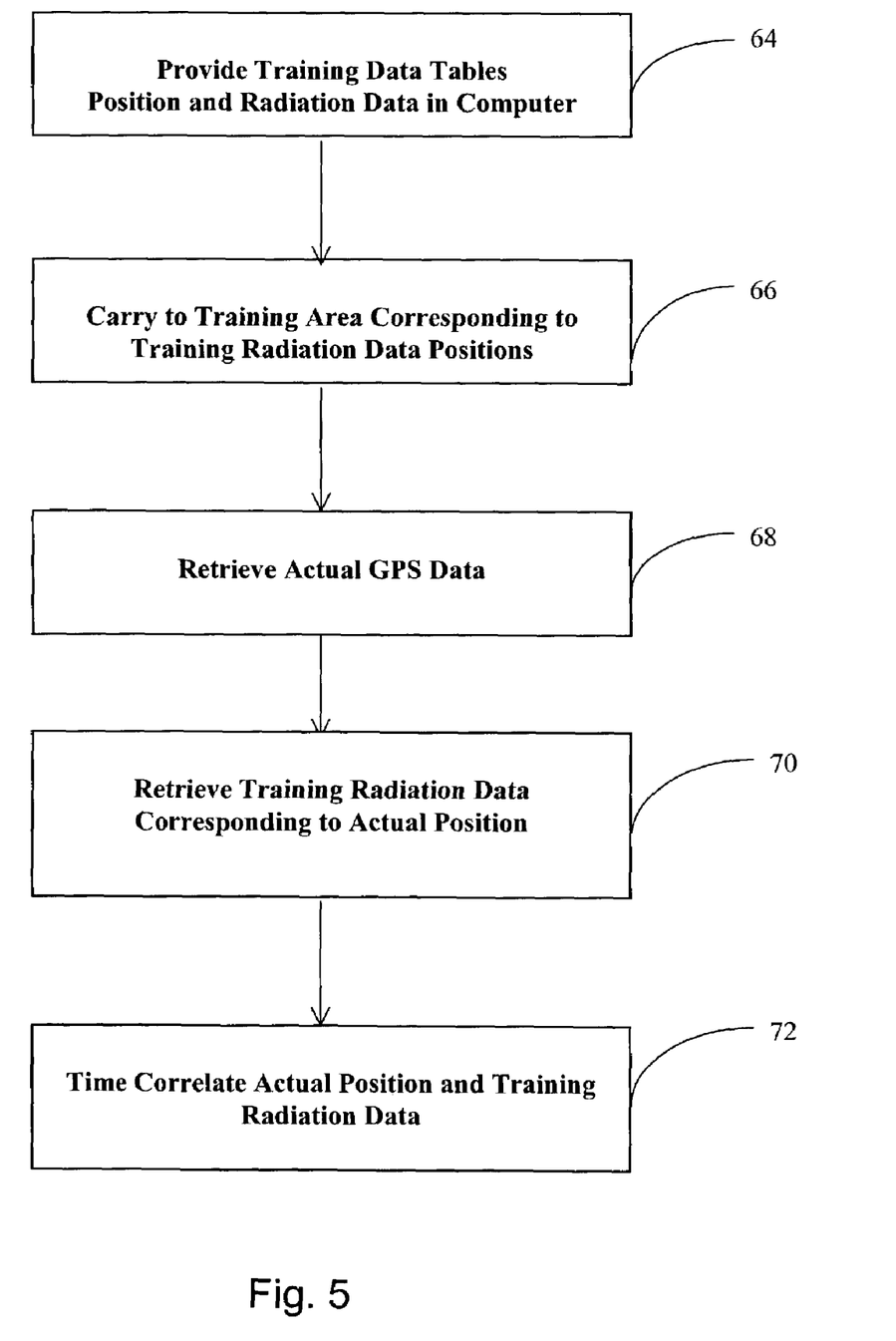
FIG. 5 is a flow diagram illustrating a method for training personnel in the use of a system for collecting and storing radiation data and position data according to one embodiment of the invention.

FIG. 5 illustrates another embodiment of a computer program product and method for use in training personnel to use a handheld system 10, such as that described in FIG. 1. According to this embodiment simulation radiation data is provided corresponding to position data in the storage medium of the handheld computer block 64. The position data and simulated radiation data are stored in a training data table. The stored radiation data is provided to a user corresponding to the user's position, therefore simulating a radiation or contamination area. As such, a training data table may be prepared with corresponding position and radiation data and stored in volatile or non-volatile storage medium of a handheld computer.

Personnel carry the handheld system to a training area corresponding to the position data block 66. As personnel progress through various positions in the training area, the handheld system collects actual GPS position data block 68 and searches the table to retrieve corresponding simulated radiation data block 70. The collected simulation radiation data and actual GPS data are then correlated to a time block 72 and stored in a storage medium for further transfer to a remote system, such as previously described in conjunction with FIGS. 1 and 2. Accordingly, this training device does not require an additional radiation detector. However, for realistic purposes, a radiation detector may be included in the handheld system and additional radiation data may be selectively retrieved from the radiation detector to provide a more realistic training situation. For example, the data tables stored with the simulated radiation data may correspond only to certain positions within a training area. The remaining positions do not correspond to a simulated radiation data, and therefore, actual radiation data may be provided by the radiation detector itself in accordance with the previously described embodiment in FIG. 2.

The foregoing has therefore described a handheld system, methods of using a handheld system, computer program products for a handheld system for collecting and storing radiation data and position data in the event of a nuclear accident or for use in training emergency personnel for such an event. In the event of a major radiation accident or attack, emergency personnel will survey the affected area. As the system is being moved, Global Positioning Satellite (GPS) location and radiation intensity may be continuously measured and transmitted to a remote system. Since airborne radiated particles can move before settling on the ground, the system can be used to continuously update a completed map. Therefore, the invention advantageously improves the ability of emergency personnel to monitor and update radiation data through a very large area. As multiple handheld systems may be used, a large area may be quickly mapped allowing emergency personnel to quickly and continuous assess the safety risks in the affected area.

As indicated above, the method collecting and storing radiation and position data may be embodied by a computer program product that directs the operation of a handheld computer or the like to monitor interfaces and issue appropriate commands to the data transfer devices. In this regard, the computer program product includes a computer-readable storage medium, such as the non-volatile storage medium, and computer-readable program code portions, such as a series of computer instructions, embodied in the computer-readable storage medium. Typically, the computer program is stored by a storage medium and executed by an associated processing unit, such as the handheld computer or the like.

In this regard, FIGS. 2, 3, 4, and 5 are block diagram, flowchart, or control flow illustrations of methods and program products according to the invention. It will be understood that each block or step of the block diagram, flowchart, or control flow illustration, and combinations of blocks in the block diagram, can be implemented by computer program instructions. These computer program instructions may be loaded onto a computer or other programmable apparatus to produce a machine, such that the instructions execute on the computer or other programmable apparatus to implement the functions specified in the block diagram, flowchart, or control flow blocks.

Accordingly, blocks or steps of the block diagram, flowchart, or control flow illustrations support combinations specified functions, combinations of steps for performing the specified functions, and program instructions for performing the specified functions. It will also be understood that each block or step of the block diagram, flowchart, or control flow illustrations, and combinations of blocks or steps, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A handheld system for collecting and storing radiation data and position data, comprising:
   a handheld computer comprising a microprocessor in communication with a storage medium and at least one communications interface;
   a radiation detector in communication with the handheld computer and interconnected to the at least one communications interface, the radiation detector providing radiation data to the microprocessor;
   a position detector in communication with the handheld computer and interconnected to the at least one communications interface, the position detector providing position data; and a computer program code disposed in the storage medium and capable of retrieving the radiation data, concurrently retrieving data from the position detector independent of retrieving data from the radiation detector, correlating data from the radiation detector and the position detector, storing the correlated data in the storage medium, and repeating the retrieving of radiation data and position data at intervals, the intervals being selected from the group consisting of time, position, and distance, wherein the correlated data defines a table with respect to position and radiation data at the intervals.

2. The handheld system according to claim 1, wherein the position detector comprises a satellite positioning system.

3. The handheld system according to claim 2, wherein the satellite positioning system comprises a Global Positioning System.

4. The handheld system according to claim 1, wherein the radiation detector comprises a radiation detector that counts radiation impulses.

5. The handheld system according to claim 4, wherein the radiation detector comprises a Geiger-Mueller detector.

6. The handheld system according to claim 1, wherein the at least one communications interface comprises a serial interface, and further comprising a serial expansion pack to permit the serial interface to interconnect to the radiation detector while also being interconnected to the position detector.

7. The handheld system according to claim 1, further comprising a wireless transmitter interconnected to the handheld computer, the computer program code being capable of transmitting the correlated data to a remote system by way of the wireless transmitter.

8. The handheld system according to claim 7, wherein the wireless transmitter comprises a cellular modem.

9. The handheld system according to claim 1, wherein the computer program code is adapted to store the correlated data in comma delimited format (CSV).

10. The handheld system according to claim 1, wherein the computer program code comprises:
    a first executable portion adapted to retrieve and time scale average the radiation data, the first executable portion retrieving the radiation data at the intervals;
    a second executable portion adapted to retrieve the position data from the position detector concurrent to and independent of the first executable portion; and
    a third executable portion adapted to correlate the radiation data and the position data and to store the correlated data in portions of the storage medium.

11. A handheld system for collecting and storing radiation data and position data, comprising:
    a handheld personal computer comprising a user input, a display, at least one communications interface, a storage medium, an operating system disposed on the storage medium, and a microprocessor for performing operations of the operating system, the microprocessor being in communication with storage medium and the at least one communications interface;
    a multiple slot PCMCIA interface interconnected to the at least one communications interface for expanding the at least one communications interface to multiple PCMCIA communications interfaces;
    a radiation detector in communication with the handheld personal computer and interconnected to the multiple slot PCMCIA interface, the radiation detector providing radiation data to the microprocessor;
    a GPS position detector in communication with the handheld personal computer and interconnected to the multiple slot PCMCIA interface, the GPS position detector providing position data; and
    a computer program code accessible by the operating system and disposed in the storage medium and capable of commanding the operating system to retrieve the radiation data, concurrently to retrieve data from the GPS position detector independent of retrieving data from the radiation detector, correlating data from the radiation detector and the GPS position detector, and storing the correlated data in the storage medium, and repeating the retrieving of radiation data and position data at intervals, the intervals being selected from the group consisting of time, position, and distance, wherein the correlated data defines a table with respect to position and radiation data at the intervals.

12. The handheld system according to claim 11, wherein the radiation detector comprises a Geiger-Mueller radiation detector.

13. The handheld system according to claim 11, wherein the multiple slot PCMCIA interface comprises a dual slot PC expansion pack.

14. The handheld system according to claim 11, further comprising the radiation detector being interconnected to the multiple slot PCMCIA interface by a serial card interface.

15. The handheld system according to claim 11, further comprising the GPS position detector being interconnected to the multiple slot PCMCIA interface by a flash adapter.

16. A computer program product for retrieving and storing radiation data and position data from at least one serial interface on a hand held computer, the computer program product comprising a computer-readable storage medium and computer-readable code portions stored thereon, the computer-readable codes portions comprising:
    a first executable portion adapted to retrieve and time scale average serial radiation data from a radiation detector interconnected to a computer interface, the first executable portion retrieving the radiation data at intervals, the intervals being selected from the group consisting of time, position, and distance;
    a second executable portion adapted to retrieve serial position data from a position detector concurrent to and independent of the first executable portion; and
    a third executable portion adapted to correlate radiation data and position data and store the correlated data in portions of the storage medium, wherein the correlated data defines a table with respect to the position data and the radiation data at the intervals.

17. The computer program product according to claim 16, further comprising a fourth executable portion adapted to operate a wireless transmitter interconnected to the handheld computer and transmit correlated radiation data and position data via the wireless transmitter.

18. The computer program product according to claim 16, further comprising a fifth executable portion adapted to generate a cue upon radiation data exceeding a predetermined value.

19. The computer program product according to claim 16, wherein the first executable portion being adapted to time scale average serial radiation on a sliding time scale.

20. The computer program product according to claim 16, further comprising the second executable portion being adapted to retrieve Global Positioning System serial data.

21. The computer program product according to claim 20, further comprising the second executable portion being adapted to convert the Global Positioning System data to Universal Transverse Mercator position data.

22. The computer program product according to claim 16, further comprising the second executable portion being adapted to convert position data to a range and direction from a predetermined geographic point.

23. The computer program product according to claim 16, further comprising the second executable portion being adapted to convert position data to a pair cardinal points distances from a predetermined geographic point.

24. The computer program product according to claim 16, further comprising the third executable portion being adapted to store the correlated data in comma delimited format.

25. A method of retrieving and storing radiation data and position data on a hand held computer, comprising:
   retrieving radiation data from a radiation detector at intervals, the intervals being selected from the group consisting of time, position, and distance;
   time scale averaging radiation data;
   retrieving position data from a position detector concurrent to and independent of the step of retrieving of data from the radiation detector;
   correlating data from the radiation detector and position detector; and
   storing the correlated data, wherein the correlated and stored data defines a table with respect to the position data and the radiation data at the intervals.

26. The method according to claim 25, wherein the step of retrieving radiation data further comprises receiving radiation impulse counts.

27. The method according to claim 25, further comprising wirelessly transmitting the correlated data to a remote system.

28. The method according to claim 25, further comprising providing a cue on the handheld computer upon radiation data exceeding a predetermined value.

29. The method according to claim 28, wherein the cue further comprises an audible alarm.

30. The method according to claim 28, wherein the cue further comprises a visual alarm.

31. The method according to claim 25, further marking a geographic position in the computer and converting the position data to a range and a direction from the marked geographic position.

32. A method of mapping radiation with a handheld system comprising a handheld computer, a position detector, and a radiation detector, the method comprising:
   carrying the handheld system toward an area of radioactivity;
   retrieving radiation data from the radiation detector to the handheld computer at intervals, the intervals being selected from the group consisting of time, position, and distance;
   retrieving position data from the position detector to the handheld computer concurrent to the step of retrieving radiation data;
   correlating the radiation data and position data corresponding to a time; and
   storing the correlated data in a computer storage medium, wherein the correlated and stored data defines a table with respect to the position data and the radiation data at the intervals.

33. The method according to claim 32 further comprising marking a geographic position in the computer storage medium and converting the position data to a range and a direction from the marked geographic position.

34. The method according to claim 32, further comprising cueing the user upon radiation data exceeding a predetermined value.

35. The method according to claim 34, wherein the cue further comprises an audible alarm.

36. The method according to claim 34, wherein the cue further comprises a visual alarm.

37. The method according to claim 32, further comprising wirelessly transmitting the correlated data to a remote system.

38. The method according to claim 37, further comprising receiving correlated data at the remote system from a plurality of handheld systems.

* * * * *